Aug. 14, 1928.
F. O. JOHNSON
ELECTROSTATIC CONDENSER
Filed July 21, 1926
1,680,546
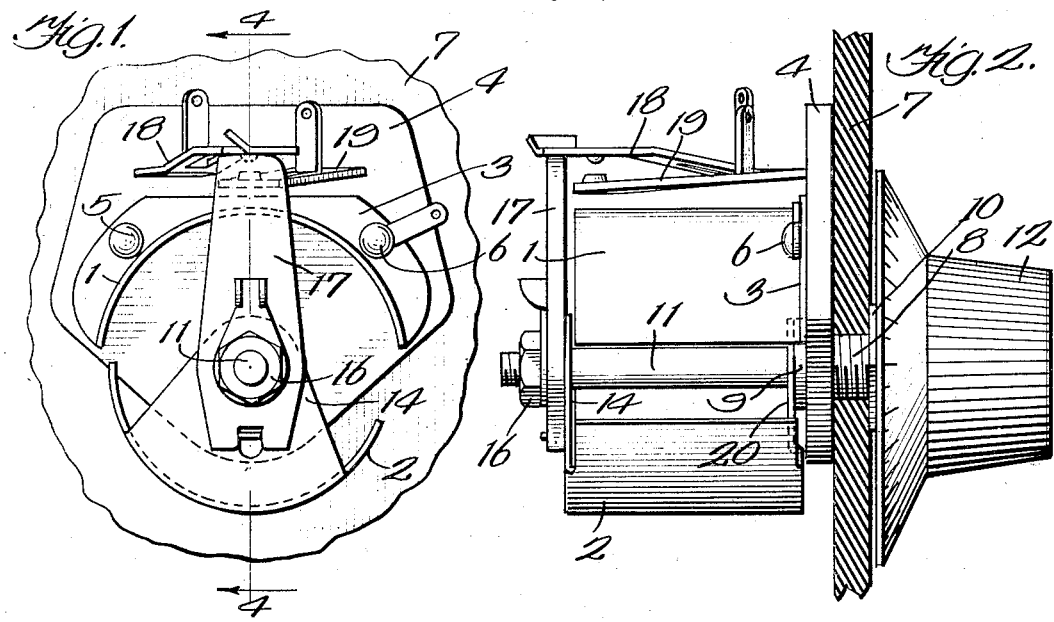
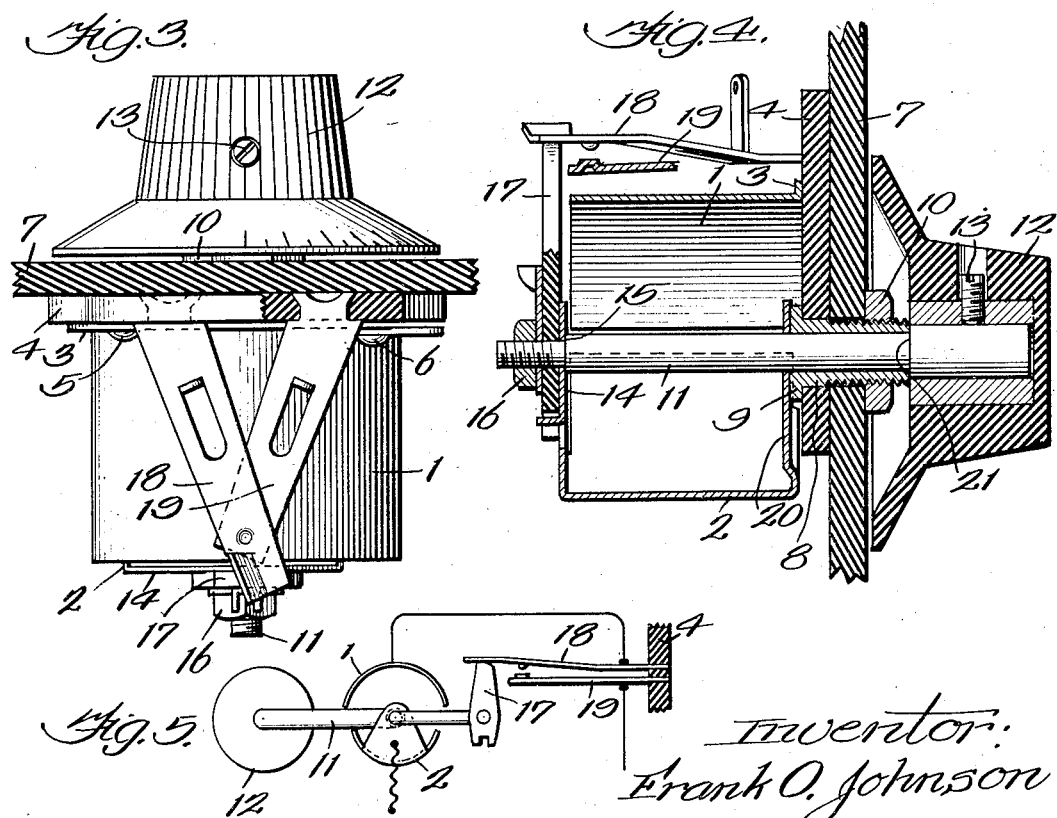
Inventor:
Frank O. Johnson Patented Aug. 14, 1928.

1,680,546

UNITED STATES PATENT OFFICE.

FRANK O. JOHNSON, OF CHICAGO, ILLINOIS, ASSIGNOR TO RELIANCE DIE & STAMPING COMPANY, OF CHICAGO, ILLINOIS, A CORPORATION OF ILLINOIS.

ELECTROSTATIC CONDENSER.

Application filed July 21, 1926. Serial No. 123,990.

My invention relates to electrostatic condensers and has two main objects in view.

One feature of my invention resides in the provision of improved means for maintaining assembly between portions of a condenser, this means residing in a resilient portion or portions provided upon a condenser plate and pressing upon an abutment for the purpose stated. This feature of my invention may also be employed in an adjustable condenser, the resilient portion or portions of one of the condenser plates serving to maintain the adjustment of the condenser that may be effected in the use thereof, in a system of radio reception, for example.

In accordance with another characteristic of the invention, a switch is coupled with an adjustable condenser plate to be operable coincidentally therewith, this switch being usually so arranged that when the condenser is adjusted to be inactive, a corelated circuit is opened. This may be the condenser circuit to eliminate the minimum capacitance.

I will explain my invention more fully by reference to the accompanying drawing in which Fig. 1 is an end elevation of a condenser constructed in accordance with the preferred embodiment of the invention; Fig. 2 is a side elevation, with the mounting panel or board in section; Fig. 3 is a plan view, with parts broken away; Fig. 4 is a sectional view on line 4—4 of Fig. 1; and Fig. 5 is a diagrammatic illustration, showing a use of the switch that is coupled with the adjustable condenser plate.

The condenser illustrated is inclusive of two metallic plates 1 and 2, each in the form of a cylinder segment, these segments being coaxially arranged. The condenser plate 1 is formed with a flange 3 which is secured upon a plate of insulation 4 by means of rivets 5, 6. The plate of insulation 4 is assembled with the panel board 7 by means of a sleeve 8, the insulating plate 4 being clamped between a flange 9 upon the inner end of the sleeve and a nut 10 screwed upon the outer end of the sleeve. The sleeve constitutes a bearing for a condenser adjusting shaft 11 upon whose outer end the adjusting knob 12 is secured by means of a set screw 13. This knob is hollow at its inner end to accommodate the nut 10 and the outer end of the sleeve 8. Both plates 1 and 2 are coaxial with the shaft, the plate 2 having a wing portion 14 which is clamped against a shoulder 15, upon the inner end of the shaft, by means of a nut 16 which is screwed upon this end of the shaft. A switch arm 17, of insulation, is clamped between the nut 16 and the shoulder 15 so as to turn with the condenser side 2. The switch illustrated includes two contact members 18 and 19 which are mounted upon the insulating plate 4. The switch arm 17 is shown as being engageable with the switch contact 18 when the two condenser plates are relatively adjusted to throw the condenser out of action, the contact 18 being then moved out of engagement with the contact 19, as indicated in Fig. 5. The switch may be included in the condenser circuit to eliminate the minimum capacitance of the condenser.

As illustrated, the portion 14 of the condenser plate 2 extends transversely of the plate and is so assembled with the shaft as to make the plate coaxial with the shaft at one end of the plate. The other end of the plate 2 is made coaxial with the shaft by means of another condenser portion 20 which also extends transversely of the plate, the portion 20 having a hole formed therethrough through which the shaft 11 is passed, this hole closely fitting the shaft but permitting longitudinal movement of the shaft. Both plate portions 14 and 20 are desirably resilient so that they both exert thrusting action upon the shaft, the plate portion 20 engaging the flange 9 upon the sleeve 8, this flange constituting an abutment which is fixed with relation to the mounting members 4 and 7. The shaft is enlarged at its outer end to provide a shoulder 21 which is forced, due to the resilience and consequent spring pressure of the plate portions 14 and 20 that exert thrusting action upon the shaft, into engagement with the outer end of the sleeve 8, which sleeve end constitutes another abutment. In the process of assembly, the plate portions 14 and 20 are pressed somewhat toward each other to place these portions under strain which is sufficient to maintain the shaft shoulder 21 in engagement with the outer end of the sleeve 8. Sufficient friction is present between the plate portion 20 and the abutment 9 and between the shoulder 21 and the outer end of the sleeve 8 to maintain the plate 2 in the position to which it is turned by the knob 12.

Changes may be made without departing from the invention.

Having thus described my invention, I claim:

1. An electrostatic condenser including a bearing sleeve and a rotatable shaft journaled in the sleeve, said shaft having a shoulder in thrusting engagement with said sleeve exerted in one direction, the condenser having a condenser plate having one portion coupled with the shaft and another portion also in thrusting engagement with said sleeve exerted in a direction opposite to the thrusting engagement of the shoulder, one of said condenser plate portions being resilient to force the aforesaid thrusting engagements.

2. An electrostatic condenser including a bearing sleeve and a rotatable shaft journaled in the sleeve, said shaft having a shoulder in thrusting engagement with said sleeve exerted in one direction, the condenser having a condenser plate in the form of a cylinder segment coaxial with the shaft and having one portion extending transversely from said plate and coupled with the shaft and another portion also extending transversely of said plate and also in thrusting engagement with said sleeve exerted in a direction opposite to the thrusting engagement of the shoulder, one of said condenser plate portions being resilient to force the aforesaid thrusting engagements.

3. An electrostatic condenser including a shaft, relatively rotatable condenser plates of which one is resilient and coupled with the shaft, and an abutment with which the resilient condenser plate has thrusting engagement to define the position of the shaft.

In witness whereof, I hereunto subscribe my name.

FRANK O. JOHNSON.